United States Patent
Chopra et al.

(10) Patent No.: US 7,567,967 B2
(45) Date of Patent: Jul. 28, 2009

(54) BUSINESS APPLICATION ENTITY SUBSCRIPTIONS SYNCH OPERATION MANAGEMENT

(75) Inventors: Gagan Chopra, Redmond, WA (US); Ahmad M. El Husseini, Redmond, WA (US); Arif Kureshy, Sammamish, WA (US); Misha H. St. Lorant, Seattle, WA (US); Dmitry V. Zhiyanov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 10/884,558

(22) Filed: Jul. 2, 2004

(65) Prior Publication Data
US 2005/0165803 A1    Jul. 28, 2005

Related U.S. Application Data

(63) Continuation-in-part of application No. 10/760,099, filed on Jan. 16, 2004.

(60) Provisional application No. 60/555,252, filed on Mar. 22, 2004.

(51) Int. Cl.
- *G06F 12/00* (2006.01)
- *G06F 7/00* (2006.01)
- *G06F 17/30* (2006.01)

(52) U.S. Cl. ........................ 707/10; 707/203
(58) Field of Classification Search ................. 707/100; 709/248
See application file for complete search history.

(56) References Cited

U.S. PATENT DOCUMENTS

| | | | |
|---|---|---|---|
| 2002/0054750 A1* | 5/2002 | Ficco et al. | 386/46 |
| 2002/0194305 A1 | 12/2002 | Sadeghi et al. | 709/218 |
| 2003/0079132 A1* | 4/2003 | Bryant | 713/182 |
| 2003/0144873 A1 | 7/2003 | Keshel | 705/1 |

(Continued)

FOREIGN PATENT DOCUMENTS

EP    1 387 272 A1    2/2004

(Continued)

OTHER PUBLICATIONS

Microsoft CRM Product Architecture, White Paper, Published: Apr. 2003, 36 pages.

(Continued)

*Primary Examiner*—John R. Cottingham
*Assistant Examiner*—Kimberly Lovel
(74) *Attorney, Agent, or Firm*—Westman, Champlin & Kelly, P.A.

(57) ABSTRACT

In a method of managing a synch operation during which business solutions entities are loaded into a mobile data store of a mobile computing device from a central data storage system, subscriptions are defined that identify entities to be loaded into the mobile data store during a synch operation. Next, a remaining data storage capacity of the mobile data store and a subscriptions data quantity corresponding to an amount of data space required to store the entities identified by the subscriptions are estimated. Finally, the subscriptions data quantity is compared to the remaining data storage capacity.

24 Claims, 15 Drawing Sheets

U.S. PATENT DOCUMENTS

| | | | |
|---|---|---|---|
| 2003/0147369 A1* | 8/2003 | Singh et al. | 370/338 |
| 2003/0159136 A1* | 8/2003 | Huang et al. | 717/171 |
| 2003/0208543 A1* | 11/2003 | Enete et al. | 709/206 |
| 2004/0078464 A1 | 4/2004 | Rajan et al. | 709/224 |
| 2004/0117358 A1 | 6/2004 | Von Kaenel et al. | 707/3 |
| 2004/0168184 A1 | 8/2004 | Steenkamp et al. | 725/31 |
| 2005/0160060 A1 | 7/2005 | Swartz et al. | 707/1 |
| 2005/0177601 A1 | 8/2005 | Chopra et al. | 707/104.1 |

FOREIGN PATENT DOCUMENTS

| | | |
|---|---|---|
| WO | WO 03/102823 A1 | 12/2003 |

OTHER PUBLICATIONS

Official Search Report of the European Patent Office for foreign application No. EP05102220; date of mailing Jan. 2, 2006.

"Nero 5 Burning Rom Brief Instructions," Internet Publication, XP-002356186, http://www.nero.com, Internet Publication, Online! 2001, pp. E1-E34.

"SynchMl Sync Protocol, version 1.1," SYNCML SYNC Protocol, Feb. 15, 2002, pp. 1-62, XP002332895.

Evaluation of a Publish/Subscribe System for Collaborative and Mobile Working Fenham, P. Kirda, E. Dustdar, S. Gall, H. Reif, G. IEEE International Workshops on Enabling Technologies Workshops on enabling technologies: infrastructure for collaborative enterprises, 2001 $11^{th}$, pp. 23-28.

From Location Database to Pervasive Catalog Chyrsanthis, P. Zadorozhny, V., International Workshop on Database and Expert Systems Applications, Database and expert systems applications, 2002 vol. 13, pp. 739-746.

Twin-Transactions—Delayed Transactions Synchronisation Model Rasheed, A. Zaslavsky, A. Lecture Notes in Computer Science Mobility and replication: Object-oriented technology, ECOOP '98 workshop reader; ECOOP '98 workshops, demos, and posters 1988 Issue 1543, pp. 311-312.

Enabling Content-centric Information Systems through Multi-layer Architectures Vassiliadis, B. Bogonikolos, N. Ponomarenko, V. Tsakalidis, A; Gatomatis, P. Giotopoulos, K. Intelligent systems and control, pp. 267-271, 2001.

DLFM: A Transactional Resource Manager Hsiao, H. I. Narang, I. Sigmod Record Management of data 2000 vol. 29, No. 2, pp. 518-528.

* cited by examiner

BUSINESS APPLICATION ENTITY SUBSCRIPTIONS SYNCH OPERATION MANAGEMENT

This application is a continuation-in-part of U.S. patent application Ser. No. 10/760,099, filed Jan. 16, 2004, the content of which is hereby incorporated by reference in its entirety; and this application claims the benefit of U.S. provisional patent application Ser. No. 60/555,252, filed Mar. 22, 2004.

BACKGROUND OF THE INVENTION

It is becoming more common for some business applications, such as Customer Relationship Management (CRM) applications, to be implemented in mobile computing devices. Such mobile computing devices include personal digital assistants (PDA's), mobile phones, and other mobile computing devices. Users of such systems generally update a database on the mobile computing device through a synching operation with a central database of a server through either a wired or wireless network connection. The synching operation makes the data, such as account information, accessible by the user of the mobile computing device.

Unfortunately, limitations in the memory capacity of mobile computing devices make it undesirable, and often impossible, to perform full uploads of the business solutions data contained in the central database. In many instances, a user's business solutions data or the data the user has access to, can exceed a gigabyte or more in size. This volume of data typically greatly exceeds the local storage capacities of mobile computing devices, particularly mobile phones. In most cases, it is extremely difficult for the user to quickly determine how much storage space is available on the mobile computing device and the amount of storage space that is required to complete the synch operation. As a result, it is common for data overflow errors to occur due to an attempt to upload more CRM data than the mobile computing device has the capacity to store.

Such errors can be costly in terms of time and money. The initial encounter of an overflow error is time consuming since the overflow error is not detected until the synch operation has uploaded enough data to the mobile computing device to exceed its available storage capacity. The correction of such an error can be time consuming due to the need to first, make more storage space available on the mobile computing device, and second, retry the synch operation. Furthermore, there is no guarantee that the second synching attempt will be successful since the user is still unable to determine whether the mobile computing device has the storage capacity to handle the unknown amount of data it is to receive during the synch operation. Such multiple synch attempts, particularly between mobile phones and the central database, can be costly due to the typical per-minute charge for use of the network.

SUMMARY OF THE INVENTION

The present invention generally relates to a method of managing a synch operation during which business solutions entities are loaded into a mobile data store of a mobile computing device from a central data storage system. In the method, subscriptions are defined that identify entities to be loaded into the mobile data store during a synch operation. Next, a remaining data storage capacity of the mobile data store and a subscriptions data quantity corresponding to an amount of data space required to store the entities identified by the subscriptions are estimated. Finally, the subscriptions data quantity is compared to the remaining data storage capacity.

BRIEF DESCRIPTION OF THE DRAWINGS

FIGS. 4-6 are screenshots illustrating an example of a customization of a system screen in accordance with embodiments of the present invention.

FIG. 15 is an exemplary screenshot of a Related Record Settings view, in accordance with embodiments of the invention.

FIGS. 16-20 are exemplary screenshots of non-entity specific subscription option views, in accordance with embodiments of the invention.

DETAILED DESCRIPTION OF ILLUSTRATIVE EMBODIMENTS

The present invention generally relates to a system and method of managing synch operations between a mobile computing device and a central data storage system. In general, the mobile computing device includes a software-implemented business process or application that allows a user of the mobile computing device to filter the data that is available in the central data storage system such that a subset of the data can be loaded to the mobile computing device during a synching operation. Additionally, the present invention provides information to the user regarding the ability to upload data subscribed to by the user to the mobile computing during a synch operation. Such information is provided to the user prior to execution of the synch operation, to thereby allow the user to avoid overflow errors caused by attempts to upload more data than the mobile computing device can store. Prior to discussing the present invention in greater detail, one embodiment of an illustrative environment in which the present invention can be used will be discussed.

Computing Environment

Figure 1:
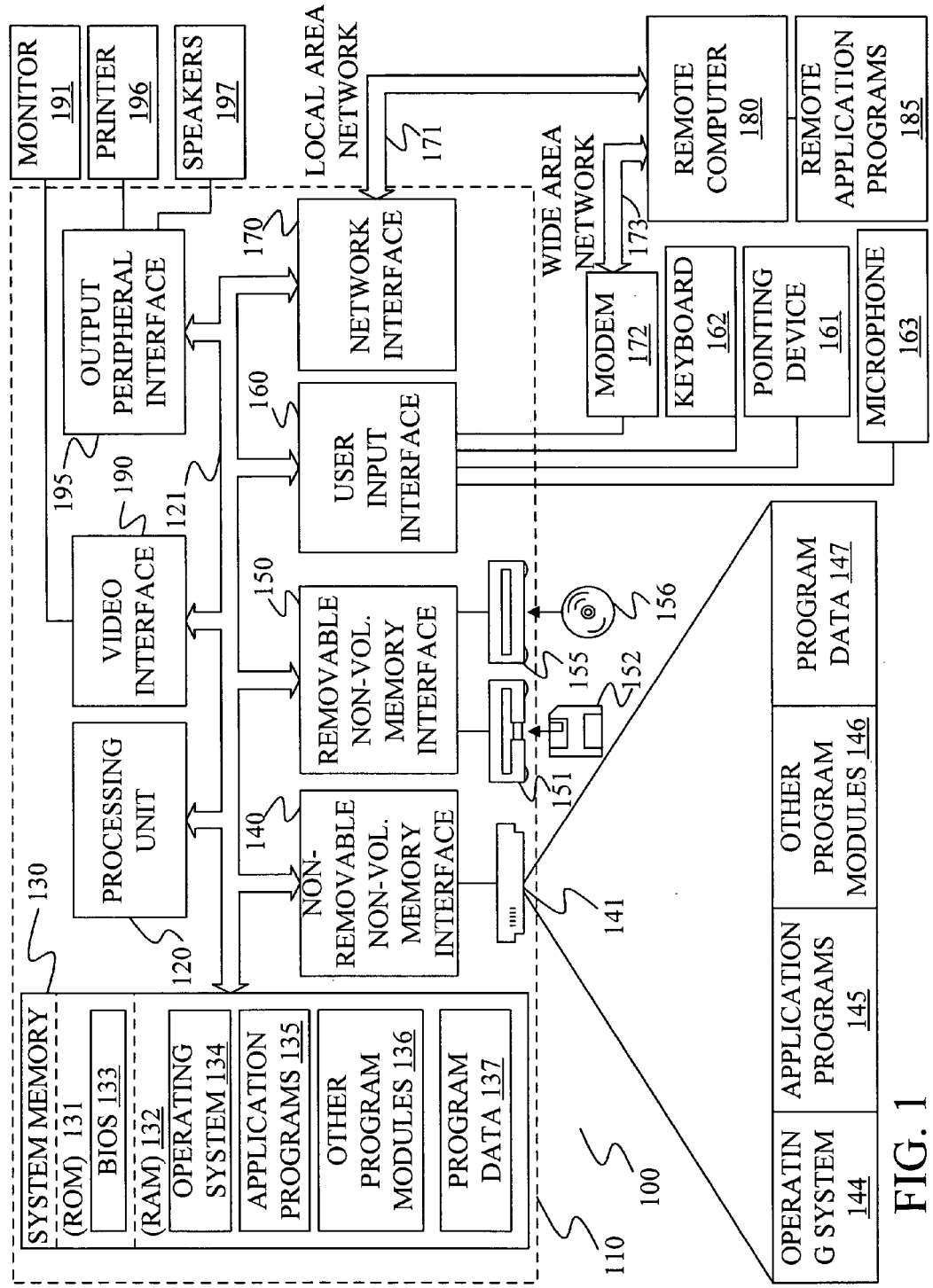
FIG. 1 is a block diagram of an environment in which the present invention can be used.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Software-Implemented Business Process or Application

One aspect of the method and system of the present invention is generally directed to customizing a software-implemented business process or application that utilizes an object-relational (or entity-relational) data storage system. Such customization is desirable to allow for affordable business applications to be produced that are specific enough to increase business productivity while, at the same time, are general enough to attract a wide customer base.

The method and system of the present invention are particularly useful when used to provide business solutions entity customization and filtering for business applications, such as Customer Relationship Management (CRM) applications, on mobile computing devices. Such applications are configured to support businesses in a variety of ways. For example, CRM applications help businesses build profitable customer relationships by allowing, for example, sales and service employees to share information, such as sales leads, customer history, and searchable knowledgebases. For instance, a car salesperson may be interested in the mileage of a customer's car, whereas an insurance salesperson would rather know about a customer's age and health history. The present invention provides the tools that are necessary to customize the application to suit the needs of car and insurance salespeople, farmers, and other salespeople.

Figure 2:
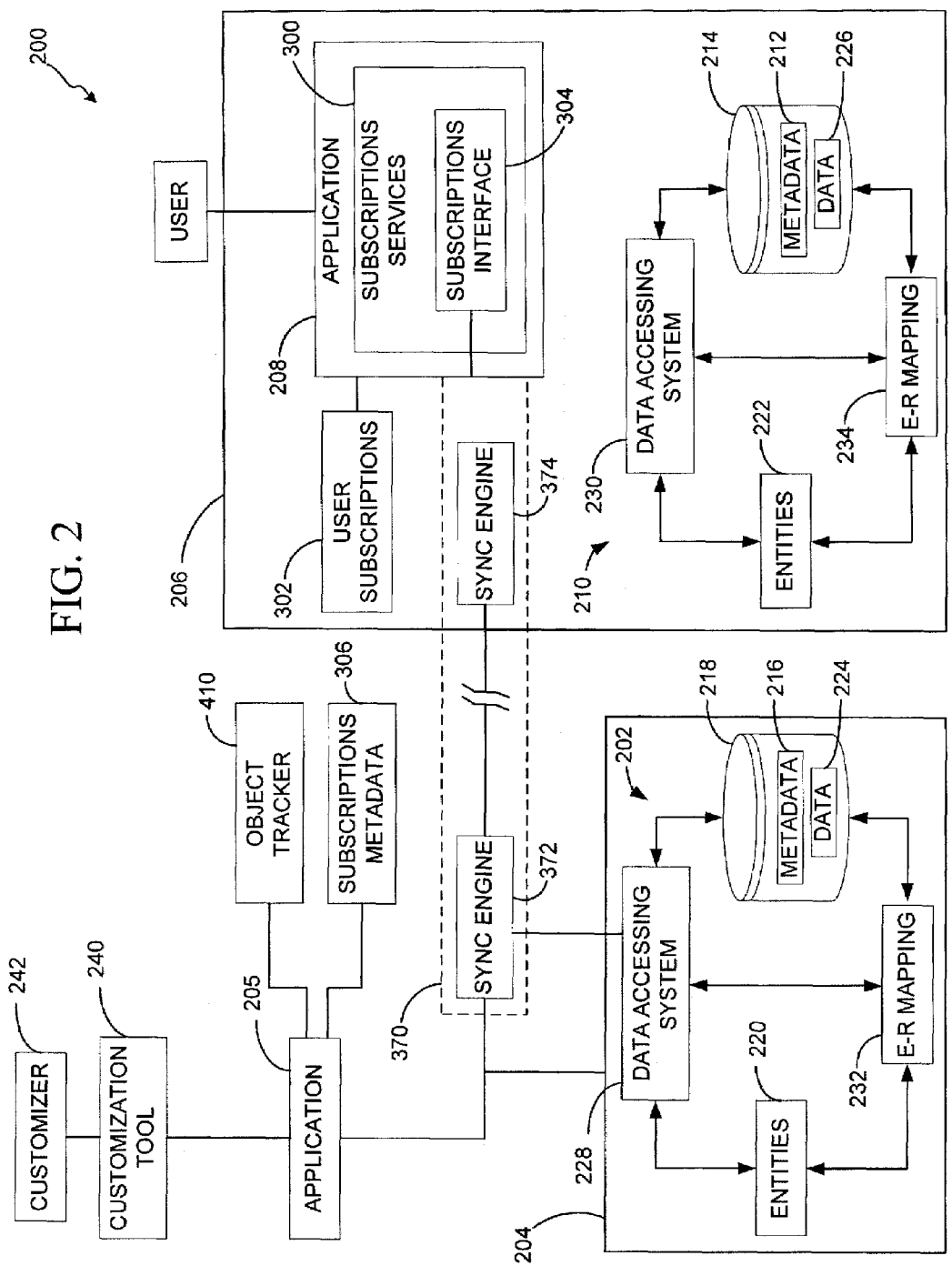
FIG. 2 is a block diagram of an example of a system configured to implement methods of the present invention for customizing a computer-implemented business process, in accordance with embodiments of the invention.

FIG. 2 is a schematic diagram of an example of a system, designated as 200, in accordance with embodiments of the present invention. System 200 generally includes a central data storage system 202 on server 204 having a central business application 205 and one or more mobile computing devices 206, each of which include a mobile business application 208 and a mobile data storage system 210.

Business application 208 is preferably driven by metadata 212 contained in mobile relational database or data store 214, which, in accordance with one embodiment of the invention, is a subset of customized metadata 216 contained in relational database or data store 218 of central data storage system 202. The metadata (212 and 216) generally define the elements of the data structures of the systems 202 and 210 and control how the application 208 operates and displays itself.

One advantage to this approach is that the metadata driven application 208 on mobile computing device 206 can be customized by an administrator who does not understand how to code using, for example, graphical user interface tools. Additionally, customizations can be easily deployed onto the server 204 as customized metadata 216 and onto the mobile computing devices 206 (e.g., personal digital assistants (PDA's), mobile phones, etc.) as mobile metadata 212 without recompiling the code for application 208. Furthermore, application 208 can be updated through installation of service packs without losing any of the customizations that have been made. As a result, application 208 can easily evolve along with the needs of a business without requiring the intervention of the developer of the business application.

The data storage systems 202 and 210 are preferably entity-relational (E-R) storage systems. However, it should be noted that the present invention can be used with other types of data storage systems and, therefore, is not limited to E-R systems. The data storage systems 202 and 210 respectively include a set of entities (or objects) 220 and 222, which correspond to relational data 224 and 226 stored in the corresponding database or data stores 218 and 214. Data storage systems 202 and 210 also include data accessing systems 228 and 230, which respectively provide access to the relational data 224 and 226 by matching the data to the entities 220 and 222 using entity-relational (E-R) maps 232 and 234. Examples of the types of entities that may be used in the context of a CRM business application include Accounts, Contacts, Activities, Opportunities, Notes, More Addresses, and other types of entities that would be useful in the business application. Although the present invention also applies to business applications utilizing other types of entities, embodiments of the present invention will be described with regard to a CRM business application in order to simplify the discussion.

Data storage systems 202 and 210 can include additional maps, such as a map defining relationships between objects of entities 220 and 222. Accordingly, Account entity records can be mapped to related Contacts, Activities and Opportunities entity records or objects.

Entities 220 and 222 of data storage systems 202 and 210 can be rendered in accordance with metadata 216 and 212. Accordingly, the metadata 216 and 212 can comprise individual metadata entities, each of which define one of the entities 220 and 222 of the systems 202 and 210. The metadata 216 and 212 define basic classes of content for the entities 220 and 222 including data content and user interface content. The data content represents information that the system stores. For example, the data content may include customers, inventory items, orders, etc., each of which is defined by a data field. User interface content includes content that a user sees on a screen or report. It may contain such things as layout information, messages, data field labels, etc. These types of contents, as well as other types, can be customized in accordance with various embodiments of the present invention.

Metadata 216 are customized using customization tool 240 based upon input 242 from an administrator or customizer of system 200. Customization tool 240 generally provides a graphical user interface that assists the customizer 242 through the process of customizing metadata 216. Initially, each new metadata entity may consist of a base metadata entity that contains default data and user interface content settings. The user interface of the customization tool 240 preferably allows the customizer to add, delete, and modify the data and user interface content of the base metadata entity. Once the customized metadata 216 is provided by the customizer, it will be used to customize the application 208 of the mobile computing device 206. When the application 208 is updated or a new software package is installed on mobile computing device 206, the customizations are installed and applied automatically without user intervention.

Figure 3:
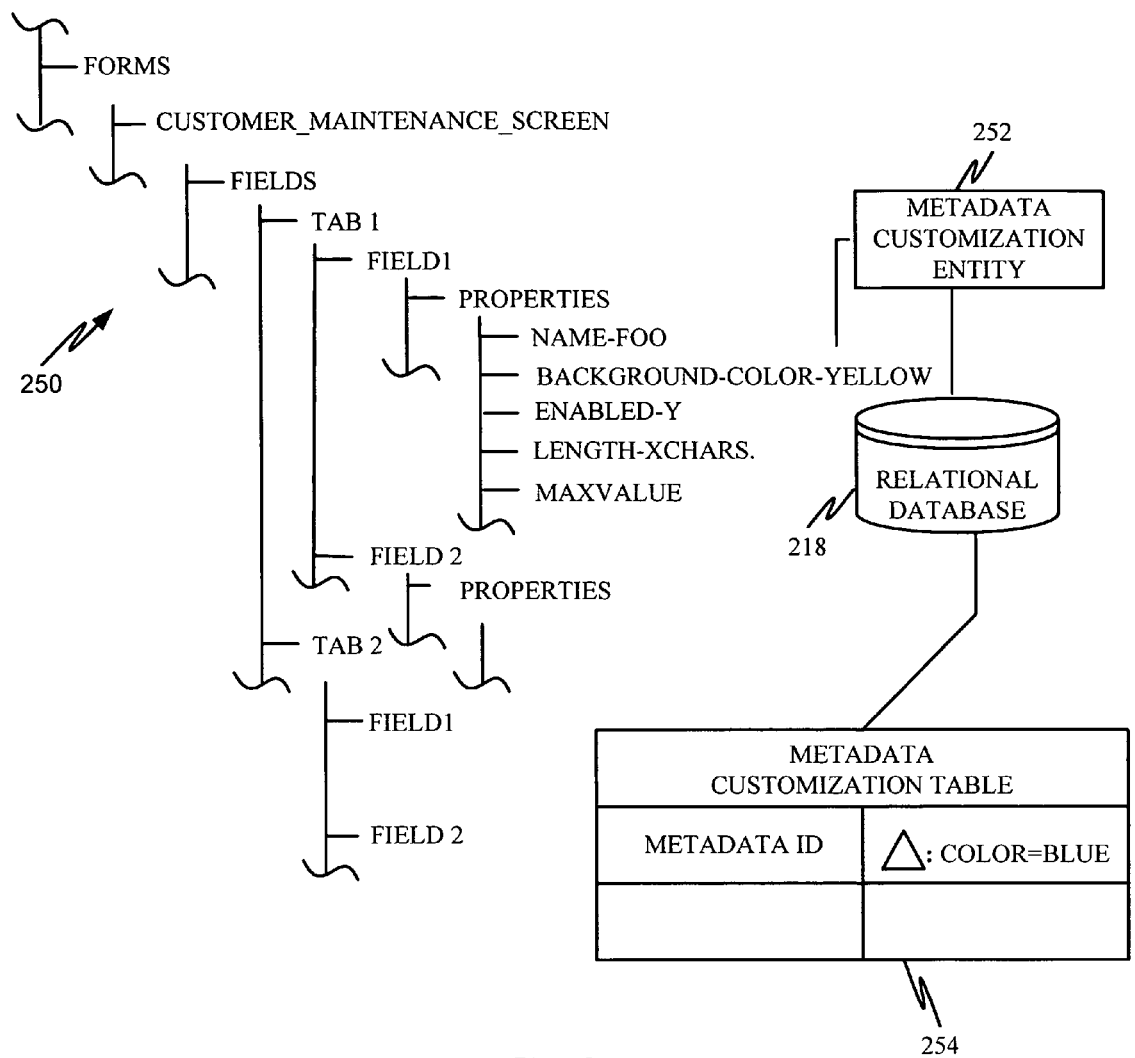
FIG. 3 illustrates an embodiment of a metadata structure and customizations in accordance with embodiments of the present invention.

FIG. 3 illustrates a metadata structure and metadata customization in accordance with embodiments of the invention. The metadata structure is illustrated by a portion of a metadata structure tree 250. It will be appreciated that the portion of tree 250 shown in FIG. 3 is illustratively but a very small portion of a much larger tree that defines customized metadata 216 for system 200. Portions of the metadata structure tree define metadata entities, such as metadata entity 252, which correspond to entities 220 in data storage system 202.

The portion of metadata structure tree 250 shown in FIG. 3 illustrates that the metadata includes a Form section (user interface content) which itself includes a Customer_Maintenance_Screen. The Customer_Maintenance_Screen includes fields (data content) which have a plurality of Tab controls. Tab control 1 has a Field 1 associated with it. Field 1 has a plurality of properties, including the field name, the background color for the field, whether the field is enabled or disabled, the length of the field, and the data type for the field (which in this case is MaxValue). Of course, the field can have a plurality of additional properties as well.

The business solutions entities 220 can include searchable fields as defined by the corresponding metadata entities 252. For example, business solutions entities corresponding to a CRM business application may include an entity types field (e.g., Accounts Contacts, etc.), a postal/zip code field, a state field, date fields, related entities fields, and other fields, which can be configured to contain searchable data. As will be explained in greater detail below, such fields can be used for purposes of identifying particular business solutions entities 220 that a user of mobile computing device 206 wishes to subscribe to an upload to the device 206.

In order to customize a metadata structure 250, the customizer 242 inputs the customization specification through customization tool 240. Customization of the metadata 216 can be achieved through direct input of the setting, or an addition of a node. For example, the background color for the field having a name "foo" is yellow in metadata structure 250. Assume that a customizer wishes to change the background color to blue. In that case, the customizer makes the change by directly inputting the color change to blue through the graphical user interface provided by the customization tool 240.

Alternatively, customization of metadata 216 can be achieved by using deltas. A delta represents a change in the metadata structure 250 from its original form. A customization can contain any number, n, of deltas, each delta representing a specific change relative to a known instance of a base structure. Further, the delta need not simply represent a change to an existing node, but can represent the addition of a new node in the metadata structure 250.

For example, in order to make the change described above with respect to the field named "foo", the customizer will make a single customization containing a single delta. The customization is relative to the field "foo" under Tab 1 of the Customer_Maintenance_Screen. The customization can be stored in a separate part of the metadata store (database or data store 218) or in a metadata customization entity 252 which is mapped to the relational database 218. A metadata customization table 254 in relational database 218 contains a metadata ID identifying the background color property of field 1 under tab 1 of the fields in the Customer_Maintenance_Screen portion of the Forms. Table 254 also includes delta information which identifies the delta, that being that the background color of the field is changed to blue. Thus, the delta is not a copy of the source that has been modified. Instead, it is only a specification of which value in structure 250 should be modified. By only tracking deltas, it is possible for many modifications to be dynamically applied to a target entity.

Figure 4:
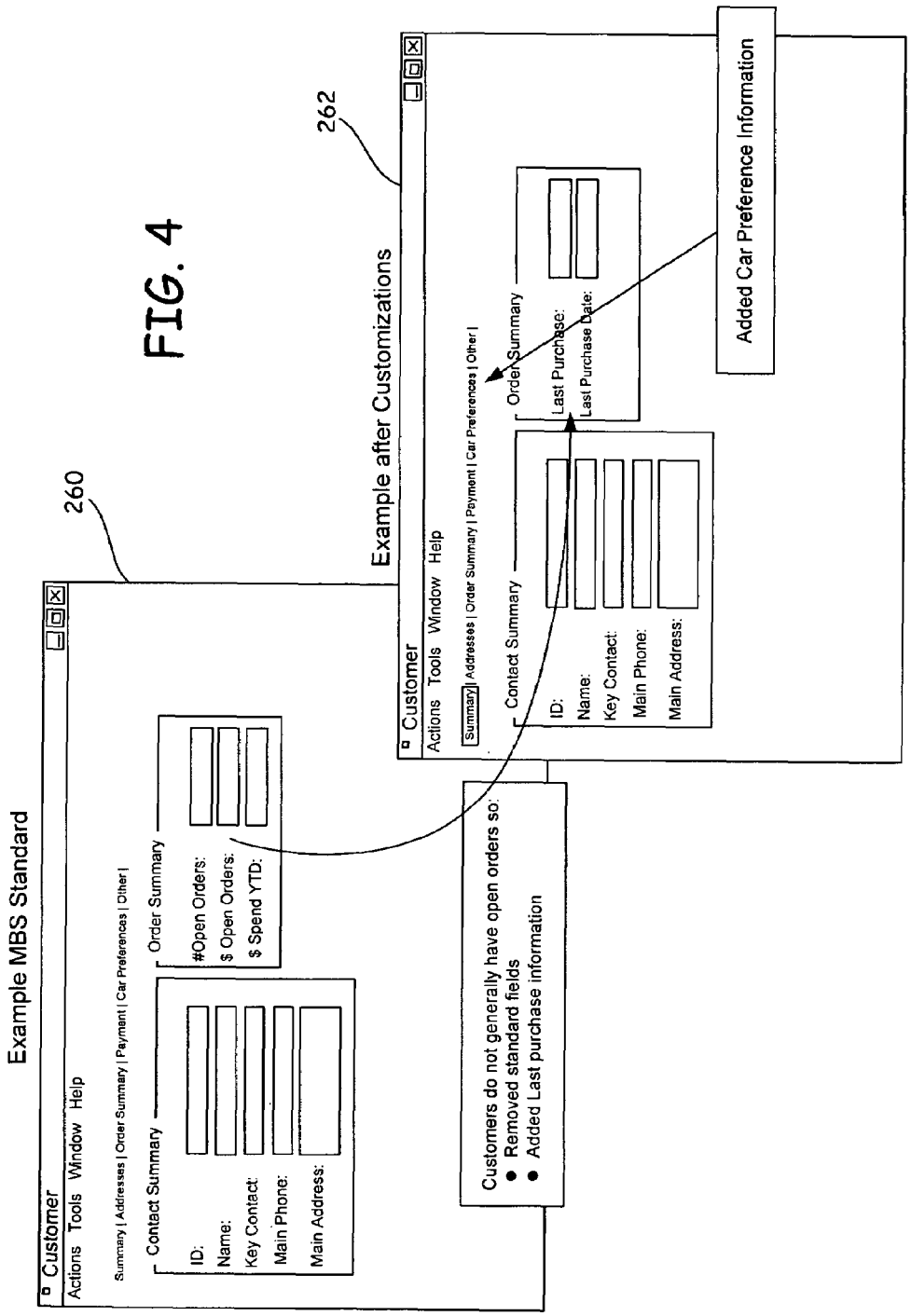
Figure 5:
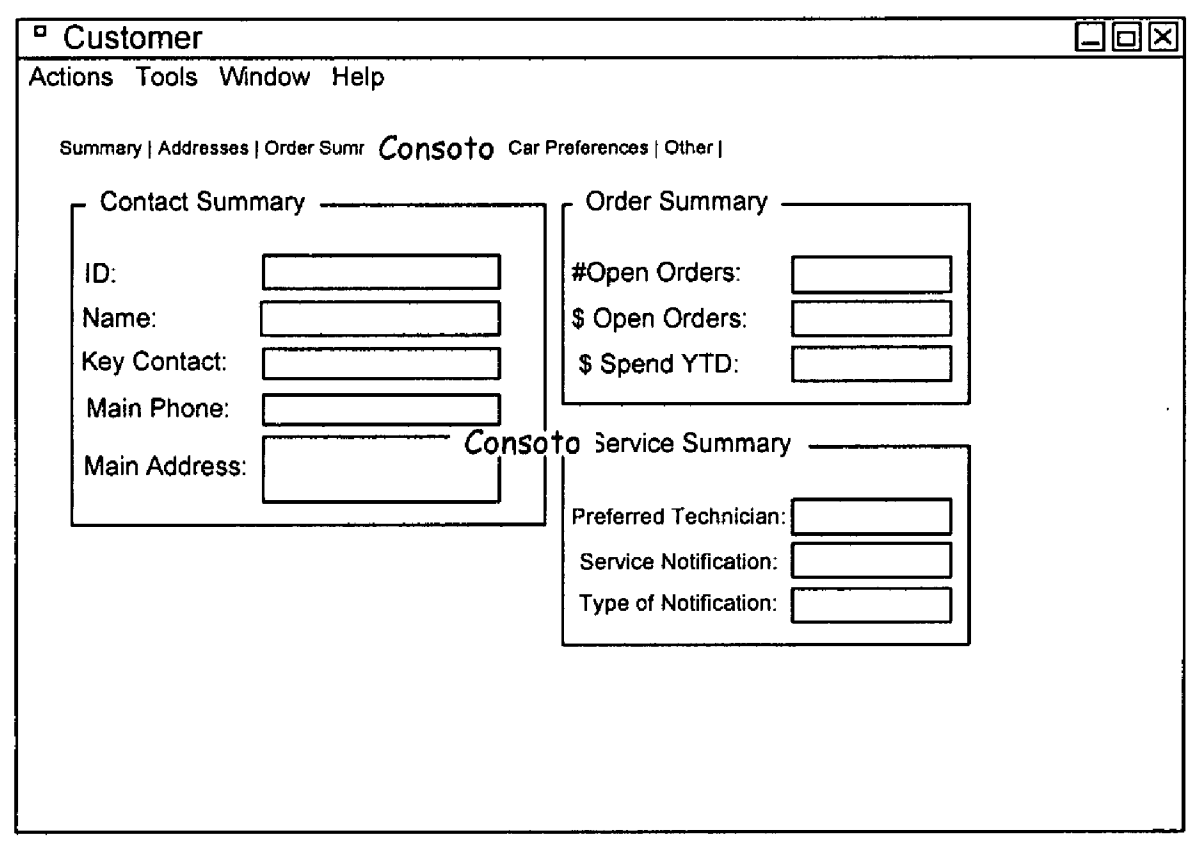
Figure 6:
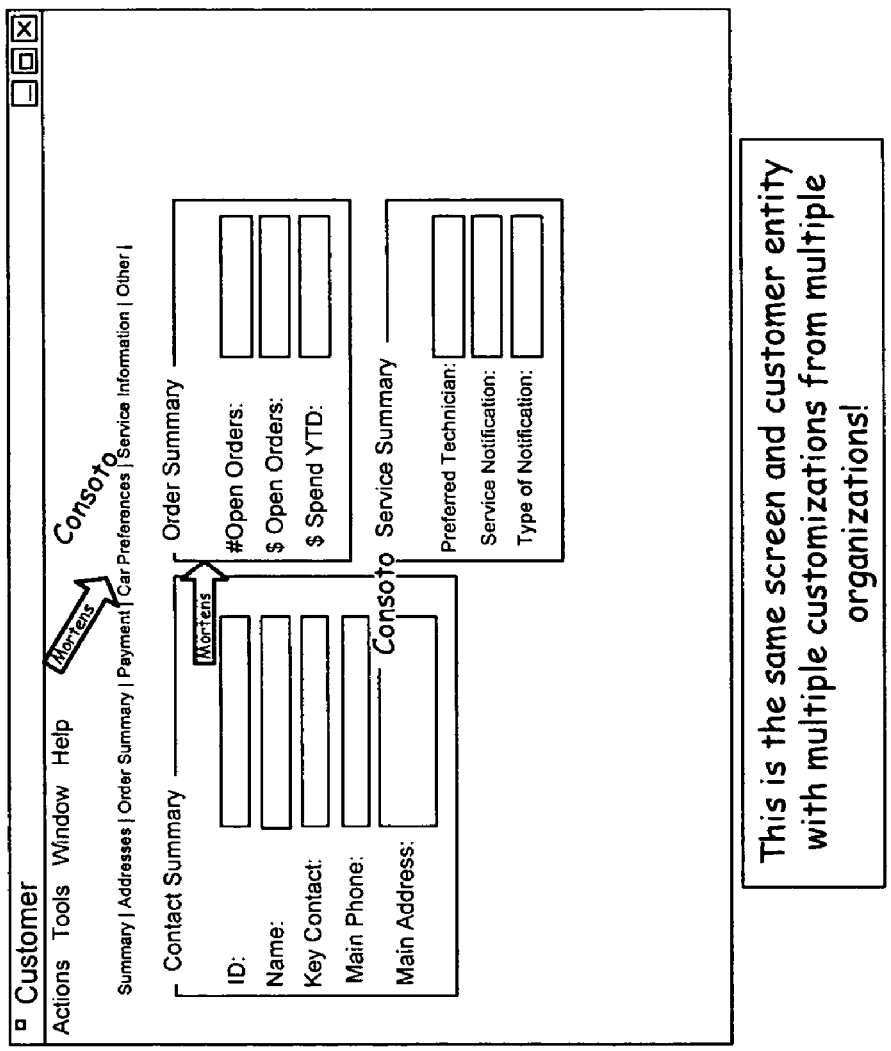

FIGS. 4-6 illustrate an example of a customization of application 208 through metadata customization. In the example illustrated in FIGS. 4-6 assume that a car dealership Mortens Autos purchases a financial software package. After installation and running of the application package, Mortens Autos customizes the product to add fields (data content) to track each customer car preferences (such as color, engine, make/model, etc.). Assume that Mortens Autos also adds new fields to a customer screen for the customer car preferences, and removes a number of unused fields.

FIG. 4 illustrates a screenshot 260 of a default customer screen displayed by the financial package purchased by Mortens Autos that has been generated in accordance with a default or base metadata entity. It can be seen that screen 260 includes order summary fields which are not generally used in the car dealer industry. FIG. 4 also shows the same customer screen 262 after customizations to the metadata entity have been implemented. The original order summary fields have been replaced with fields indicating the customer's last purchase and last purchase date. In addition, a car preferences tab has been added to display the customer's car preferences. This is all accomplished simply by customizing the associated metadata 216 using the customization tool 240 of system 200, as discussed above.

Next, assume that another business solutions provider, Consoto, introduces electronic mail notifications for service reminders. Assume further that the customer entity provided by Consoto also adds a string to the customer entity for the name of the customer's favorite technician and a text box for a new field to the customer screen. An example of Consoto's customer screen is illustrated in FIG. 5. Assume that Mortens Autos buys, from Consoto, a software package to run the service department.

After the installation, all previous customizations still work without manual intervention or rework. This is shown in FIG. 6. For instance, the customer's car preferences field is shown on the screen and the original Order fields are removed from the screen. Similarly, Consoto's changes to the customer screen are also provided. Specifically, the new fields on the customer entity and text boxes on the customer screen are included. As is described above, when the new software package is installed, the customizations take effect without automatically, without user intervention.

Subscription Services

One aspect of the present invention is directed to a subscription services application module 300 (FIG. 2) of the business application 208 on the remote or mobile computing device 206. The subscription services application 300 allows the user to avoid loading large amounts of unnecessary data to the mobile computing device 206, which generally has a limited data storage capacity as compared to non-mobile computing devices, such as desktop computers. Additionally, this aspect of the present invention allows the user to select only those entities that are relevant to his or her business practice.

The subscriptions aspect of the present invention also allows the user to select how the entities and objects are viewed on the mobile computing device 206. In general, the subscriptions operate as filters to reduce the number of entities viewed by the user to only those that are relevant. Such filtering of the entities and particular entity objects allows the user to operate the mobile application 208 more efficiently by avoiding having to sort through a large number of entities on the mobile computing device 206 that are unrelated to their current practice.

The subscriptions 302 generally identify entities 220, corresponding metadata 216 and data 224 that are to be sent from the central storage system 202 to the mobile computing device 206 during a synch operation for storage in mobile data storage system 210 respectively as entities 222, metadata 212 and data 226. As will be explained in greater detail below, the subscriptions 302 can be defined, for example, through direct selection from a list of the entities 220, through selection of various categories of the entities 220, or by defining various filter queries (relational database statements such as SQL statements) that form a request for the desired entities 220. The subscriptions 302, once defined, preferably generate the necessary relational database statements to cause the server 202 to return the desired or identified entities 220 for storage on mobile computing device 206 during a synch operation.

Subscriptions Interface

The subscription services application module 300 generates a subscriptions interface 304, through which the user defines the subscriptions 302. The subscriptions interface 304 can be generated in accordance with subscriptions metadata 306 provided to the mobile computing device 206 from the server. The subscriptions metadata 306 is configured by an administrator or customizer 242 of the server using, for example, customization tool 240, by selecting available entities 220 and corresponding object types. Alternatively, the metadata 216 can include the subscription metadata 306 and, thus, be used to generate the subscriptions interface 304.

The customization tool 240 generates the subscriptions metadata 306 in response to the entities selected by the administrator 242, which includes help strings, user-definable parameters, condition types (text, number, etc.), user-interface content, and other information that is used to dynamically generate the subscriptions interface 304 on the mobile computing device 206.

Figure 7:
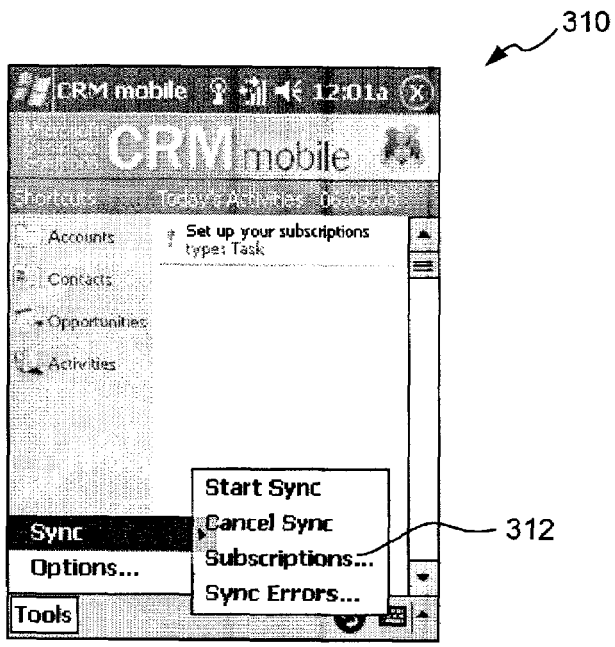
FIG. 7 is an exemplary screenshot of a start-up screen of a mobile business application, in accordance with embodiments of the invention.

The subscriptions interface 304 preferably includes a graphical user interface through which the user can define various parameters that are used to designate the desired subscriptions to data-sets or records at the sub-entity level. Initially, the user may view a start-up screen 310 of the business application 208, an exemplary screenshot of which is illustrated in FIG. 7. The start-up screen 310 provides the user with the option of activating the subscription services application module 302 through the selection of the subscriptions option 312.

Figure 8:
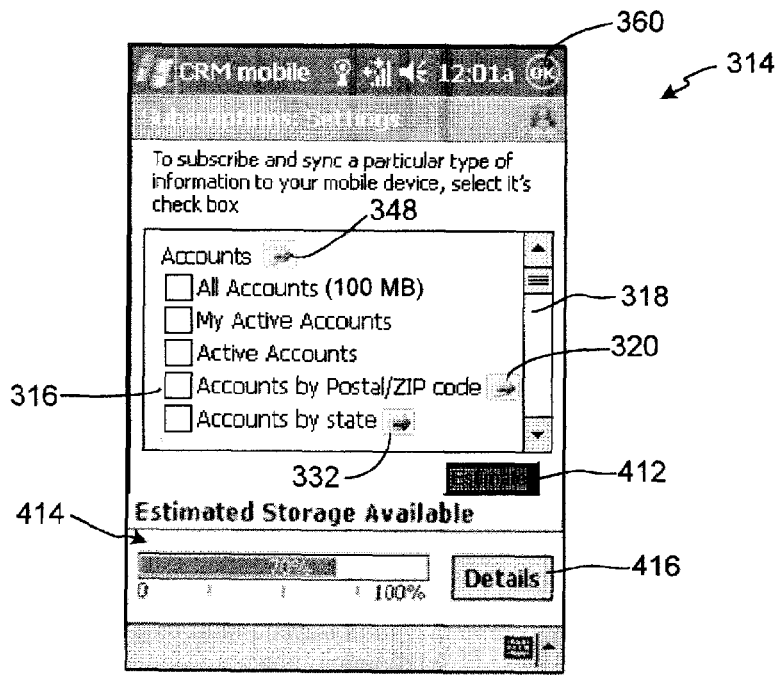
FIG. 8 is an exemplary screenshot of a subscription settings view, in accordance with embodiments of the invention.

The selection of the subscriptions option 312 brings up a subscription settings view 314, an exemplary screenshot of which is illustrated in FIG. 8. The subscription settings view 314, which is preferably defined by the subscriptions metadata 306, automatically reflects the full and correct (updated) list of entities 220 that are available for subscription by the user.

In accordance with one embodiment of the invention, the entities 220 are divided into various entity types. As mentioned above, such entity types for CRM business applications can include, for example, Accounts, Contacts, Opportunities, Activities, and other types of entities as defined by the subscriptions metadata 306. Additionally, each type of entity 220 can be divided into various categories as defined by the fields of the entities 220 as defined by the customized metadata 216, such as active entities, inactive entities, entities by postal/zip code, entities by state, and other categories. The selection of the categories for a given entity type generate subscriptions 302 to the corresponding entities 220 identified thereby. Such selections can be made, for example, by checking a corresponding box, such as box 316 for the Accounts by postal/zip code category shown in FIG. 8. Other suitable methods of selecting the available categories can also be used.

In the exemplary subscription settings view 314 of FIG. 8, only a portion of the available categories for the exemplary Accounts entity type are shown. The remaining available types of entities and their corresponding categories can be provided below the Accounts entity type listings and viewed using the scroll bar 318. Alternative methods of displaying the various entity types and categories can also be used, such as separate tabbed pages for each entity type.

As mentioned above, the business solutions entities 220 can include various searchable fields. In accordance with one embodiment of the invention, the subscriptions 302 can be configured to define a parameterized filter that is used to retrieve corresponding entities in accordance with the options defined by the subscriptions metadata 306. For example, the user can define parameterized filter options to identify or search fields of the business solutions entities 220, such as a postal/zip code field, a state field, and other fields. Those entities 220 that match the search criteria of the subscriptions 302 can then be identified and uploaded to the mobile computing device 206 during a synch operation. Examples of the categories and filter options that are available for the exemplary business solutions entities provided herein will be discussed in greater detail below.

Accounts Entity Type Subscription Options

For the Accounts entity type, the category selections or filter options can include predefined subscriptions such as, for example, All Accounts, My Active Accounts, Active Accounts, and Inactive Accounts (not shown), the selection of which would define the subscriptions 302 accordingly. Thus, the selection of the All Accounts category or filter option would cause all available account entities 220 or account entity records to be loaded to the mobile device 206 during a synch operation with the server 204. Likewise, the selections of My Active Accounts, Active Accounts, and Inactive Accounts (not shown) would result in the respective loading of all of the accounts that are active for the user, all accounts that are active, and all accounts that are inactive, when the mobile device 206 is synched with the server 204.

As mentioned above, the categories or filter options can include user-definable, or parameterized filter options such as Accounts by postal/zip code and Accounts by State, related objects (not shown), and other filter options. The user of mobile computing device 206 can access various views where the parameters of the user-definable filter options can be defined. Such views are defined by the subscription metadata 306 and generally include a help strings or instructions for the user and a filter parameter entry or selection options.

Figure 9:
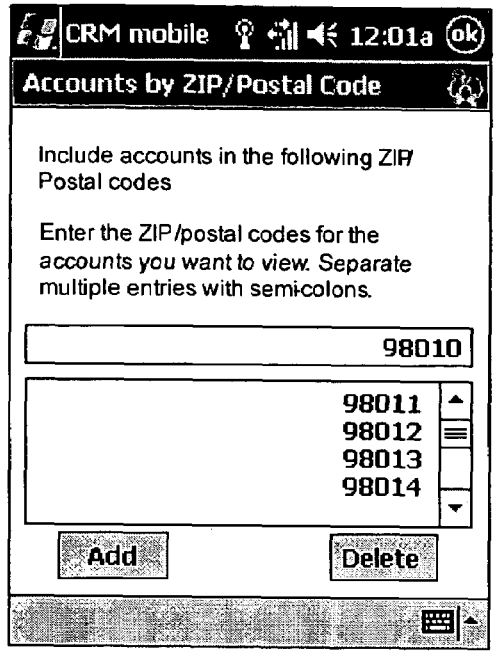
FIG. 9 is an exemplary screenshot of a postal/zip code view, in accordance with embodiments of the invention.

For example, the selection of the icon 320 for the Accounts by postal/zip code category brings forth the postal/zip code view 330, an exemplary screenshot of which is illustrated in FIG. 9. The user can generate a list of postal/zip codes in the view 330 for the records of the Accounts entity type that the user wishes to subscribe to.

Figure 10:
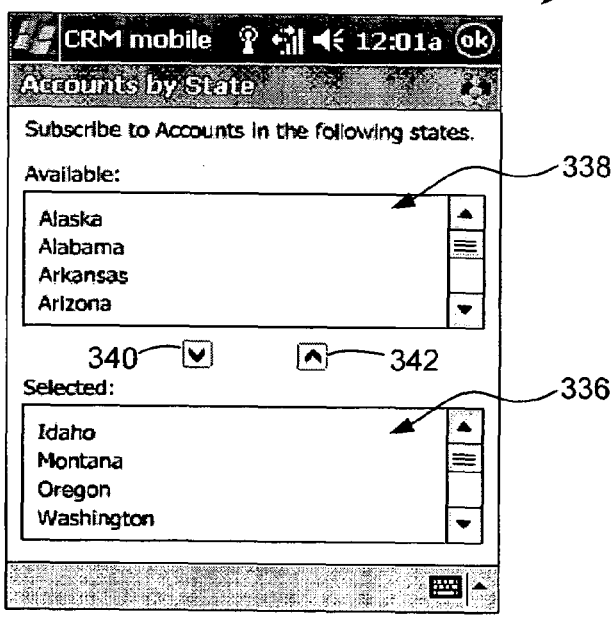
FIG. 10 is an exemplary screenshot of a State view, in accordance with various embodiments of the invention.

Similarly, the selection of the icon 332 (FIG. 8) for the Accounts by State option calls the Accounts by State view 334, an exemplary screenshot of which is illustrated in FIG. 10. The user can use the Accounts by State view 334 to subscribe to entities having the Account type in the states contained in a list 336. States can be added to the list 336 by selecting states in list 338 and pressing arrow 340. Similarly, states can be removed from the list 336 by selecting the states in list 336 and pressing arrow 342. In this manner, the user can generate the desired list of states 336 and thereby define the subscriptions 302 to identify the entities 220 having the Account entity type that correspond to the states contained in the list 336.

In accordance with one embodiment of the invention, the user is provided an option of selecting objects or entities having a specified type that are related or associated with a selected entity or entity category for inclusion in the subscriptions 302. Such relationships can be defined by the E-R mapping data or the metadata of the selected entity or entity category.

Figure 11:
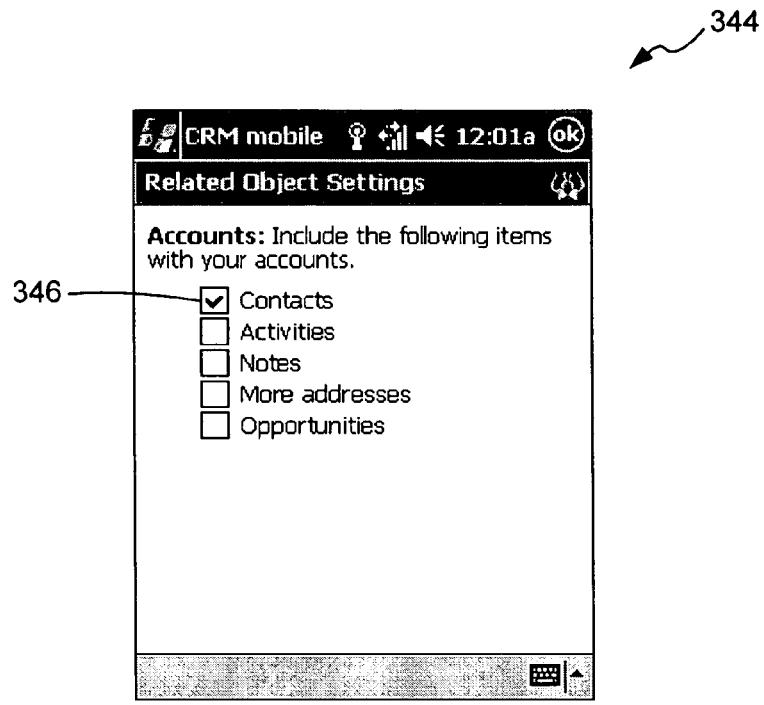
FIGS. 11 and 12 are exemplary screenshots of Related Object (or Record) Settings view, in accordance with embodiments of the invention.

For example, a related objects category or filter option can be selected for one of the Accounts entity categories which opens an Accounts Related Object Settings view 344, an exemplary screenshot of which is illustrated in FIG. 11. The related object options include the associated Contacts, Activities and Opportunities types of entities. Additional related objects, such as Notes (e.g., notes relating to the subscribed account entity records), More Addresses (e.g., addresses relating to the subscribed account entity records), and other associated objects can also be provided. The selection of any of the related entity types through the checking of the adjacent box, such as box 346 for the associated Contacts entity type, results in the subscriptions 302 identifying those entities or objects that are associated with the selected entity type and correspond to the entities of the selected entity category. Accordingly, if the user has selected an entity category of the Accounts entity type for subscription and chooses to include subscriptions to the associated Contacts entities, the subscriptions 302 would then be defined to identify the entities of the Contacts type that are associated with the entities of the Accounts type that are contained in the selected category.

Referring again to FIG. 8, the user can also select the icon 348 corresponding to the Accounts entity type which can open a view for the user where the records or objects of the Accounts entity type are shown. Preferably, only the records of the Accounts entity that have been subscribed to are viewed. Alternatively, all available entities 220 or records of the Accounts entity type are shown. The user can then be provided with the option of adding or removing subscriptions to individual entity records.

Contacts Entity Type Subscription Options

For the Contacts entity type, the filter options can include predefined subscriptions such as, for example, All Contacts, My Active Contacts, and My Inactive Contacts, the selection of which would respectively result in the subscriptions 302 identifying all available contacts or contact entity records, all of the contacts that are active for the user, and all of the contacts that are inactive for the user. When the mobile device 206 is synched with the server 202, all entities 220 identified by the subscriptions 302 are loaded to mobile device 206.

Additionally, the filter options can include user-definable, or parameterized, filter options such as Contacts by postal/zip code and Contacts by State, related objects, and other filter options. User can access various views where the parameters of the user-definable filter options can be defined by selecting the corresponding arrow icon, as discussed above for the Accounts entity. Such views are defined by the subscription metadata 306 and generally include a help string or instructions for the user and a filter parameter entry or selection options.

Figure 12:
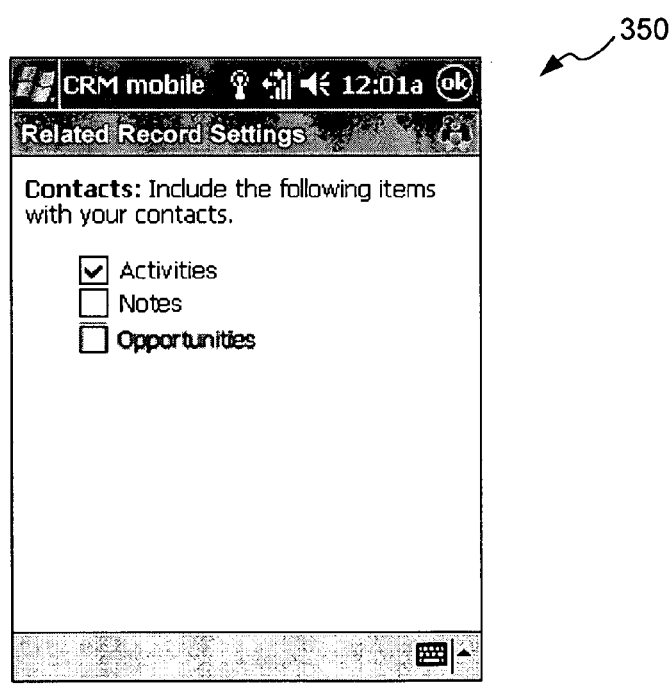
Figure 13:
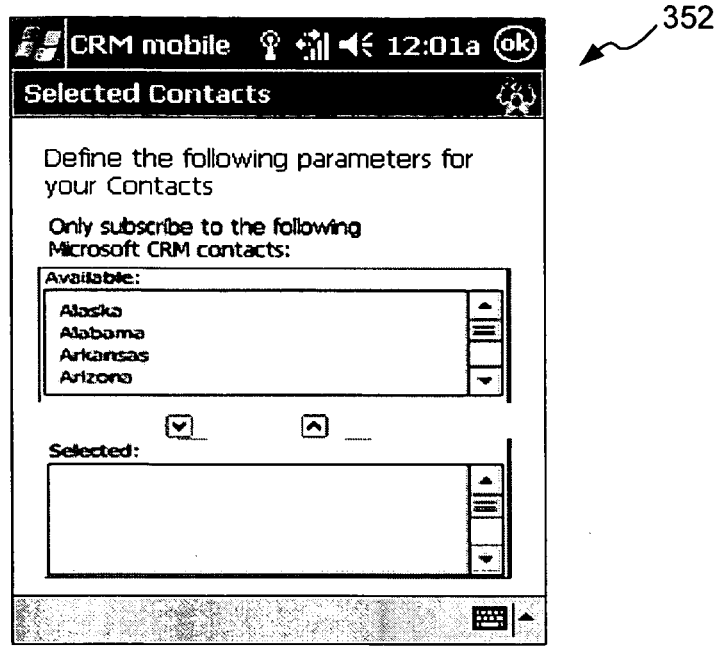
FIG. 13 is an exemplary screenshot of a State view, in accordance with embodiments of the invention.

An exemplary screenshot of the Contacts Related Objects view 350 is provided in FIG. 12, where the user can add related Activities (selected), Notes and Opportunities objects. An exemplary screenshot of the Contacts by State view 352 is provided in FIG. 13. The user can subscribe to the desired contacts in the same manner described above for the Accounts by State view. The Contacts by postal/zip code view operates in the manner discussed above for the Accounts by postal/zip view.

Activities Entity Type Subscription Options

Subscription options similar to those described above can also be provided for the Activities entity type, such as All Activities and My Open Activities subscription options. Additional predefined opportunity subscription options include Closed Activities, Activities Due Within a Period of Time (e.g., a week, a month, etc.), Activities Closing within a Period of Time (e.g., a week, a month, etc.), New Activities, and other predefined subscription options as desired by the user.

Figure 14:
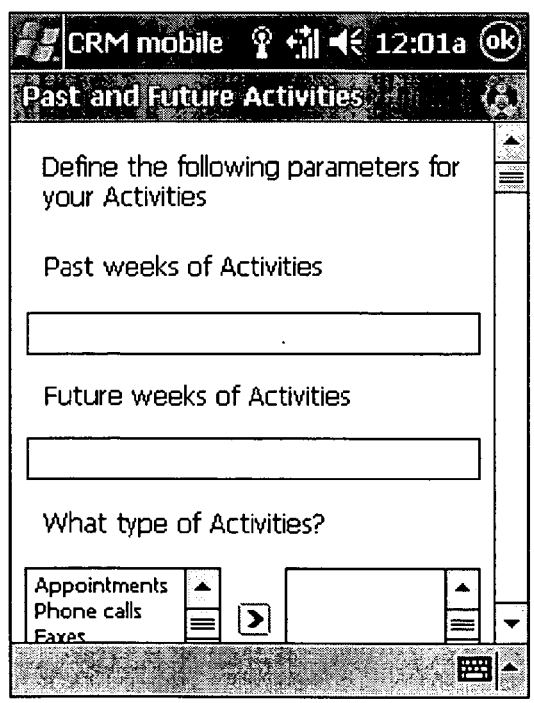
FIG. 14 is an exemplary screenshot of a Past and Future Activities view, in accordance with embodiments of the invention.

User-definable or parameterized subscription options similar to those described above can be provided for the Activity entity type, such as Activities by postal/zip code, Activities by State, Activities related objects, and other filter options, which the user can access and define through various views, as described above. Additional user-definable subscription options for the Activities Entity can also be provided, such as subscriptions based upon a selection of past and future weeks of activities and the type of activities, as illustrated in the exemplary screenshot of FIG. 14.

Opportunities Entity Type Subscription Options

Subscription options similar to those described above can be provided for the Opportunities entity type, such as All Opportunities and My Active Opportunities subscription options. Additional predefined opportunity subscription options include Closed Opportunities, Opportunities Closing within a period of time (e.g., next week or month), New Opportunities, New Opportunities Next Week or Month, New Opportunities Last Week or Month, and other predefined subscription options as desired by the user.

Figures 15, 16:
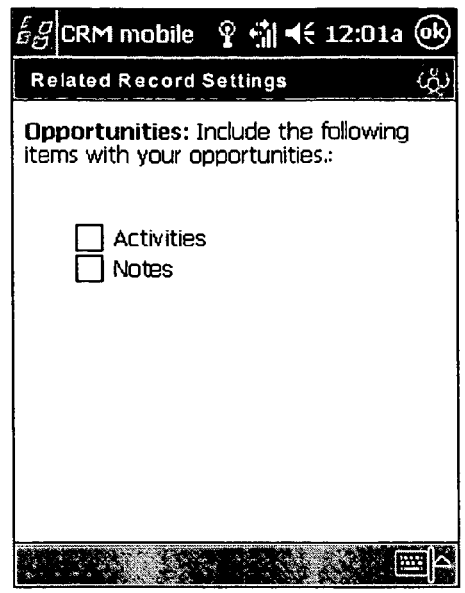

Likewise, user-definable or parameterized subscription options similar to those described above can be provided for the Opportunities Entity, such as Opportunities by postal/zip code, Opportunities by State, and other filter options, which the user can access through various views where the parameters of the user-definable subscription options can be defined. Opportunities related objects subscription options can also be provided, such as options to include related Activities and Notes objects, as illustrated in the exemplary screenshot of FIG. 15.

Non-Entity Specific Subscription Options

Figures 17, 18:
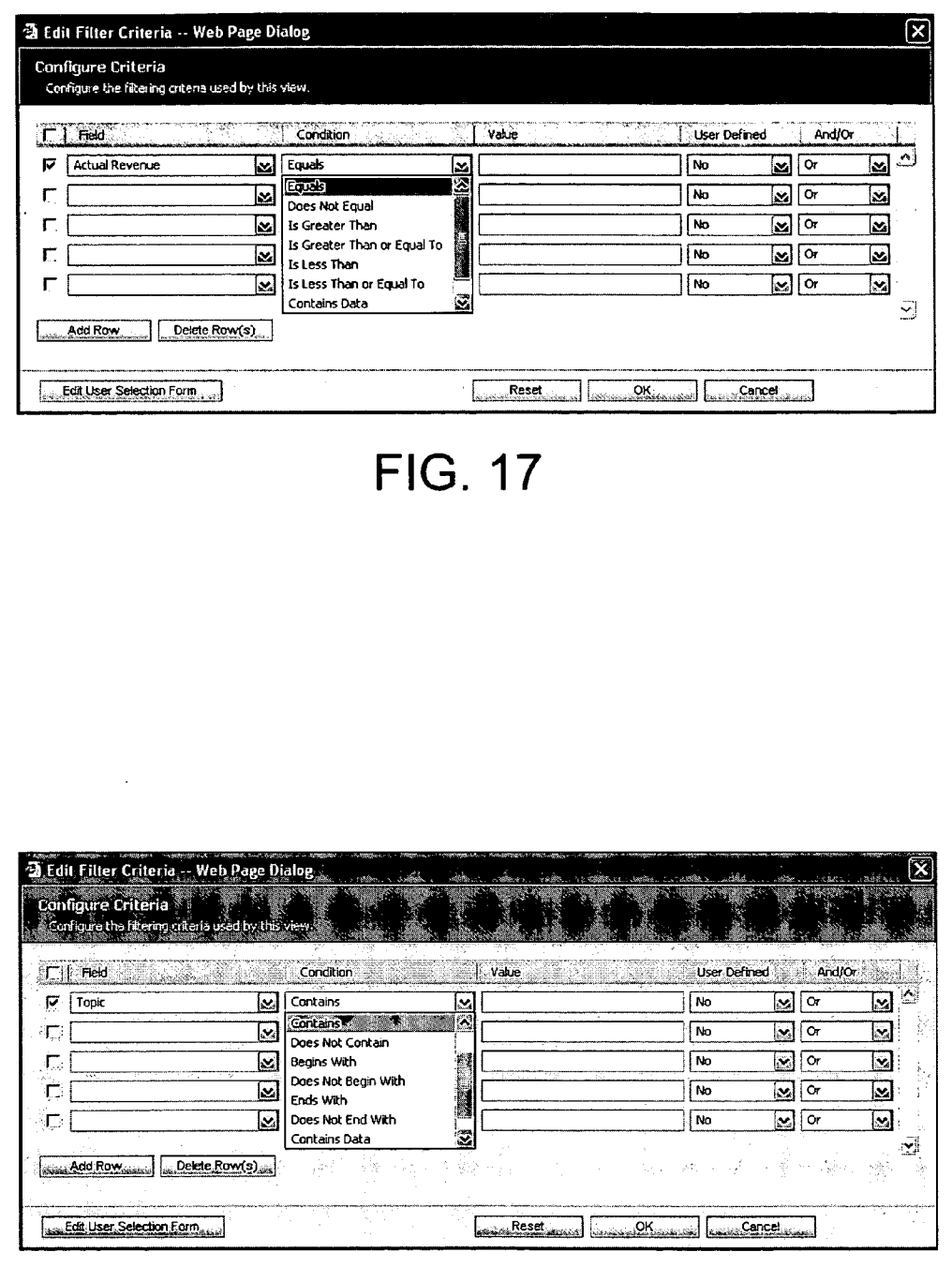
Figure 19:
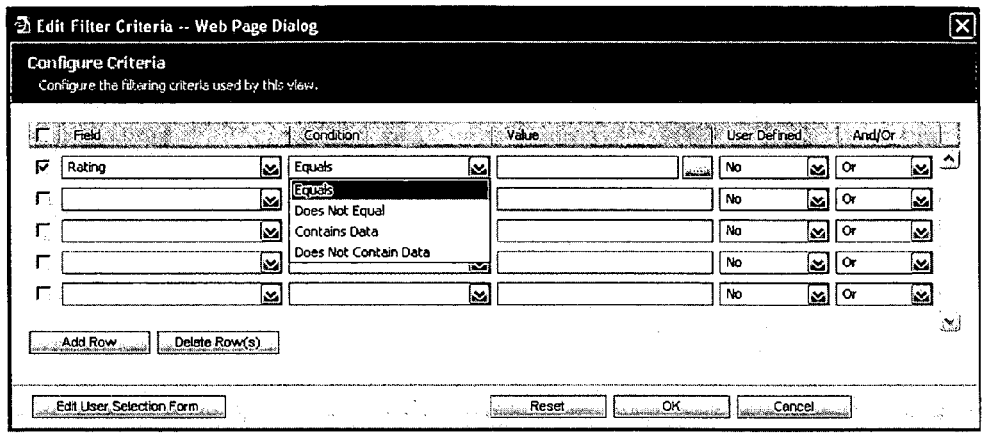
Figure 20:
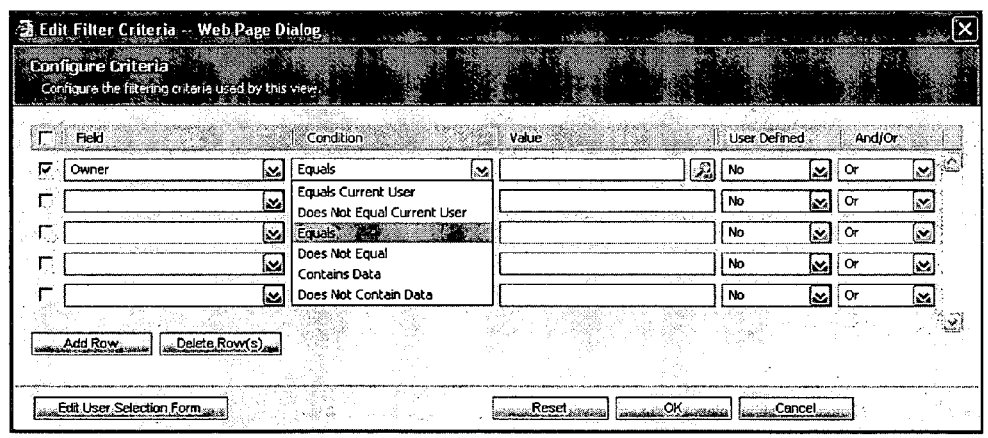

In accordance with yet another embodiment of the invention, user-definable subscription options are provided to the user without regard to any particular entity type (i.e., Accounts, Contacts, etc.). Instead, the subscriptions 302 are defined to identify entities through a user-defined filter query through the setting of various fields and conditions. For example, the user can subscribe to entity records based upon conditions and fields having a data type of date (FIG. 16), integer (FIG. 17), string (FIG. 18), value (FIG. 19), or other data type. Additionally, more complex fields, such as "Owner" and associated conditions can be set by the user to obtain the desired subscriptions, as illustrated in FIG. 20.

Synch Operation

After the user is satisfied with his or her predefined and user-defined subscription selections and settings, the user selects the "OK" button 360, shown in FIG. 8, which sets the user subscriptions 302 and starts a synch operation provided that the mobile computing device is in communication with the central data storage system 202, and the user has either made changes to his or her subscriptions since the last synch or new data is available for the user's current subscriptions.

During the synch operation between the central and mobile data storage systems 202 and 210, the user subscriptions 302 are sent to the central data storage system 202 and read by central application 205 to determine which entities 220, and the corresponding metadata 216 and data 224, are to be sent to the mobile computing device 206. This data transmission is performed using synchronizer 370, shown in FIG. 2. Synchronizer 370 includes synch engines 372 and 374, which are configured to form a communication link between central and mobile data storage systems 202 and 210 and allow system 200 perform a synch operation between central and mobile databases 218 and 214 in accordance with known methods. Such synch operations are preferably substantially performed in the background to allow the user of the mobile computing device 206 to access and operate the application 208 without interruption.

The entities 220 (including metadata 216) identified in the subscription list 276 are sent to mobile computing device 206, which are then stored in data store 214. Preferably, the data 224 that corresponds to the entities 220 identified in the user subscriptions 302 are also transmitted to mobile computing device 206 and stored in data store 214 by data accessing system 230, as data 226. The application 208 then renders or populates the entities 222 defined by the customized metadata entities 212 using the corresponding sent data 226 contained in data store 214. The populated or rendered entities 222 can then be displayed for the user on the mobile computing device 206 in accordance with the form or view defined by the corresponding metadata 212. One alternative to transmitting the customized metadata 216 and the corresponding data 224 separately to mobile computing device 206 is to transmit pre-constructed forms (populated entities 220) and views that correspond to the customized entities 202 identified in the user subscriptions 302.

Customization Methods

The system of the present invention described above can be used to implement a method of customizing a software-implemented business process on a mobile computing device 206. In general, system 200 can be used to define subscriptions 302 to CRM entities 220 defined by metadata 216, and upload the entities 220 to the mobile computing device 206 that are identified by the subscriptions 302. Various embodiments of the invention relate to the manner in which the subscriptions 302 are defined.

In accordance with one embodiment of the invention, the available entities 220 are displayed for the user. Next, at least one of the available entities 220 is selected and the subscriptions 302 are defined to identify the selected entities.

Entities 220 can have an associated postal/zip code. In accordance with one embodiment of the invention, the step of defining the subscriptions 302 includes selecting a postal/zip code and defining the subscriptions 302 to identify the entities 220 that are associated with the selected postal/zip code, as described above with reference to FIGS. 8 and 9.

The entities 220 can also have an associated state. In accordance with yet another embodiment of the step of defining the subscriptions 302, a state is selected and the subscriptions 302 are defined to identify the entities 220 that are associated with the selected state, as discussed above with reference to FIGS. 8, 10 and 13.

The entities 220 can also have an associated date. In accordance with another embodiment of the step of defining the subscriptions 302, a date or a range of dates is selected and the subscriptions 302 are defined to identify the entities associated with the selected date, or a date that is within the range of dates, as discussed above with reference to FIGS. 14 and 16.

The entities 220 can also be associated with various categories. In accordance with yet another embodiment of the invention, the step of defining the subscriptions 302 includes displaying the available entity categories, selecting a category, and defining the subscriptions 302 to identify the entities 220 corresponding to the selected category, as discussed above with reference to FIG. 8. The categories can include active entities, inactive entities, entities by postal/zip code and entities by state, for example.

Additionally, the entities 220 can be associated with an entity type. The entity types can include Accounts Contacts Opportunities and Activities, for example. In accordance with one embodiment of the invention, the step of defining the subscriptions 302 includes displaying one or more of the categories for each of the entity types, selecting a category for one of the entity types, and defining the subscriptions 302 to identify the entities 220 corresponding to the selected category, as discussed above with reference to FIGS. 8, 11 and 12.

The various methods described above can be implemented by system 200, shown in FIG. 2, through the execution of instructions that are stored on a computer-readable medium and are executable by a microprocessor. The instructions generally correspond to mobile application 208 including subscriptions services module 300.

Storage Estimator

Distributed business applications commonly have rich data stores. In many instances, a user's individual data store or one the user has access to, can exceed a gigabyte or more in size. This volume of data typically greatly exceeds the local storage capacities of mobile computing devices 206, particularly mobile phones. In most cases, it is extremely difficult for the user to quickly determine how much data he or she can synch to their mobile computing device 206 and what the size of the data (by entity or data record) might be prior to performing a synch operation. Providing such information to the user would be beneficial in order to prevent overflow errors caused by attempting to upload more data to the mobile computing device 206 than it has the capacity to handle.

Figure 21:
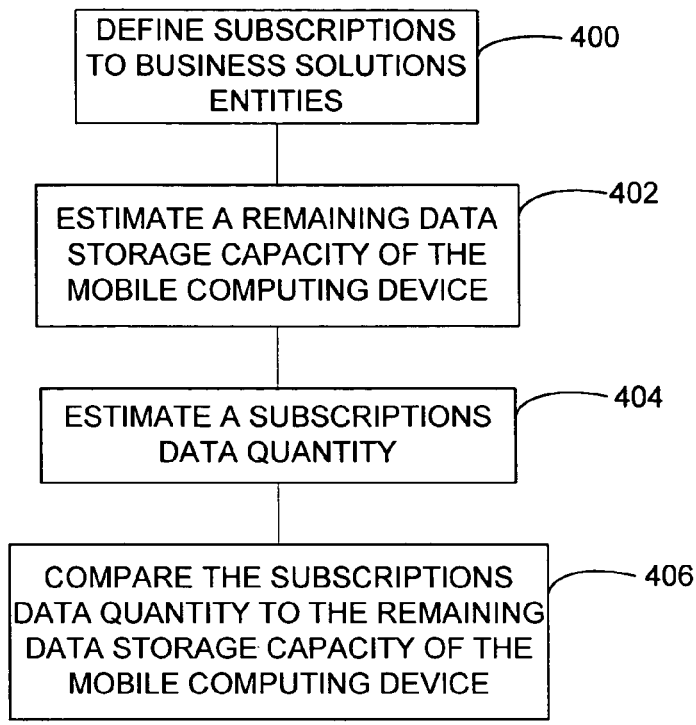
FIG. 21 illustrates a method of managing a synch operation during which business solutions entities are loaded into a mobile data store of a mobile computing device from a central data storage system, in accordance with one embodiment of the invention.

One aspect of the present invention is directed to a storage estimator feature that informs the user of the data storage capacity of the mobile computing device 206 that would remain should the user perform a synch operation to update the mobile computing device with the business solutions data or entities corresponding to the user-defined subscriptions 302. The storage estimator generally performs the method illustrated in FIG. 21. At step 400 of the method, the user initially defines subscriptions 302 (FIG. 2) in the manner described above. The subscriptions 302 identify entities 220 that are to be loaded to the mobile computing device 206, such as in mobile data store 214, during a synch operation with central data storage system 202. Next, at step 402, the remaining data storage capacity of the mobile computing device (e.g., mobile data store 214) is estimated. A subscriptions data quantity is then estimated or calculated at step 404. The subscriptions data quantity corresponds to an amount of data space that is required to store the entities identified by the subscriptions 302. Finally, at step 406, the subscriptions data quantity is compared to the remaining data storage capacity. The comparison can then be used to assess the ability of the mobile computing device 206 to complete a synch operation with the central data storage system 202 by receiving the entities 220 identified by the subscriptions 302.

The calculation or estimation steps 402 and 404 provided above, as well as the comparison step 406 can be performed on either the mobile computing device 206 by the subscriptions services application module 300, or on the remote system by central application 205, or a combination of both, for example.

In accordance with one embodiment of the invention, the step 402 of estimating the remaining data storage capacity that will be available for receiving the subscriptions data should a synch operation commence is performed by first determining the quantity of data corresponding to the business solutions entities 222 and related data (metadata 212 and data 226) that is presently stored on the mobile computing device 206. Such entity data is preferably not taken into account when the remaining data storage capacity is estimated, since the execution of a synch operation will generally result in either the loading of additional entity or subscriptions data to the mobile device 206, or the removal or replacement (update), of the entity or subscriptions data stored on mobile device 206. The quantity of the entity data stored on mobile device 206 can be maintained by mobile application 208 or central application 205 as object tracker data 410, stored either remotely from mobile device 206, as shown in FIG. 2, or on mobile device 206.

With the quantity of entity data known, a quantity of non-entity data stored on mobile device 206 can be determined by subtracting the quantity of entity data stored on the mobile computing device 206 from the total amount of data stored on the mobile computing device 206. The remaining data storage capacity of the mobile device 206 is then estimated by subtracting the quantity of non-entity data from the data storage capacity of the mobile computing device 206, such as that of data store 214.

After the user of the mobile computing device 206 proceeds with selecting new subscriptions 302 or modifying existing subscriptions 302 settings (step 400 of the method), the subscriptions data quantity can be estimated. In general, the subscriptions data quantity is estimated by communicating the subscriptions 302 to the central business application 205, which obtains the subscriptions data quantity based thereon.

As mentioned above, step 406 is completed by comparing the subscriptions data quantity to the remaining data storage capacity of the mobile device 206, to assess whether a synch operation can commence without encountering an overflow error. This step of the method can commence in response to a request by the user of the mobile device 206, such as through the pressing of an estimate button 412 in the subscription settings view 314 (FIG. 8) or through the execution of a synch command. Alternatively, each time the user makes a change to the subscriptions 302, the necessary communications can be made between the mobile computing device 206 and central application 205 to update the estimated storage capacity on the mobile computing device 206 that would remain following a synch operation.

Additional embodiments of the invention relate to the displaying of information to the user regarding the ability to perform the synch operation with the current subscriptions 302 and the amount of data storage capacity that would remain on the mobile computing device should the synch operation be performed.

In accordance with one embodiment of the invention, after the comparing step 406 is performed, the user is notified as to whether the mobile device 206 has the data storage capacity to handle the synch operation with the present subscriptions 302. Such notification can be provided to the user by way of a warning message, a display of the data storage capacity of the mobile computing device 206 that would remain following the synch operation, and through other notification methods. For instance, the amount of storage available on a mobile computing device 206 can be provided numerically (e.g., 425.6 MB or 70%), graphically (bar graph, pie chart, etc.), or a combination of both as illustrated by the data gauge 414 in FIG. 8.

Figure 22:
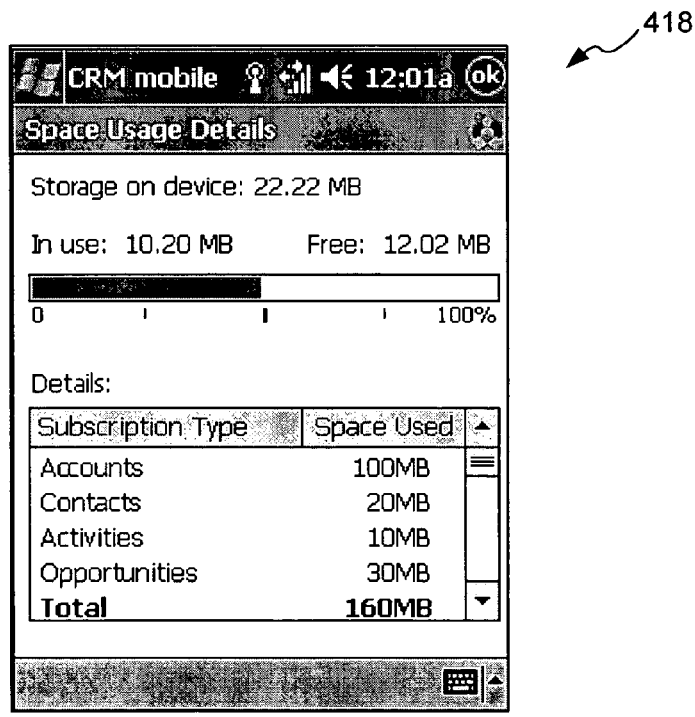
FIG. 22 is an exemplary screenshot of a space usage details view, in accordance with embodiments of the invention.

Details regarding the size of the particular entities 220 that are subscribed to by the user can also be provided. In accordance with one embodiment of the invention, such detailed information can be accessed by the user by selecting the details button 416 (FIG. 8), which opens a space usage details view 418, an exemplary screenshot of which is illustrated in FIG. 22. The space usage details view 418 preferably provides the user with the storage capacity information for the mobile computing device 206 that would remain following the synch operation through a display of numerical values, graphical representations, or a combination of both. Additionally, a display of the size of the subscriptions for each entity type (i.e., Accounts, Contacts, Activities, Opportunities, etc.) can be provided to the user, such as 100 MB for the Accounts entity, as shown in the subscriptions setting view 314 of FIG. 8. Such information provides the user with a quick understanding of how the subscriptions data is allocated. It should be understood that rather than providing the data size for the entity subscriptions numerically, a graphical representation could be used. For instance, a bar graph or data gauge could illustrate the percentage of the total amount of data of the synch operation for the particular entity subscription.

Figure 23:
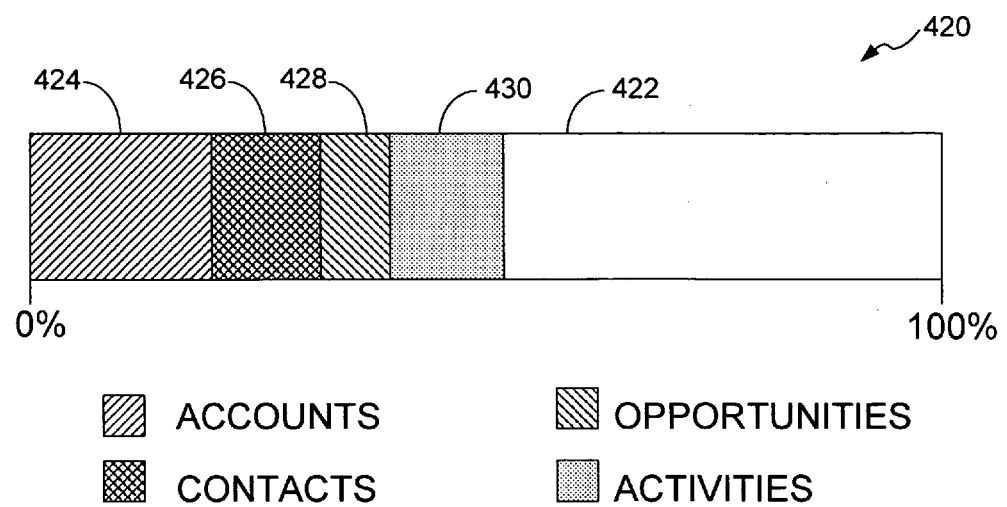
FIG. 23 illustrates a display of the subscriptions data quantity relative to the remaining data storage capacity of a mobile data store of a mobile computing device, in accordance with embodiments of the invention.

FIG. 23 illustrates a display 420 of an estimate of the storage capacity of the mobile computing device 206 that would remain if the user chose to proceed with a synch operation, in accordance an embodiment of the invention. The display 420 could be provided in the subscriptions settings view 314 of FIG. 8 in place of data gauge 414. Preferably, display 420 provides the user with both the detailed information on the size of the subscriptions for each entity type simultaneously with the estimated storage capacity of the mobile computing device 206 that would remain after the completion of the synch operation.

In accordance with one embodiment of the invention, the remaining storage capacity estimation for the mobile device 206 is illustrated by the entire bar graph 422. The total data of the proposed synch operation is further broken down into entity type components, the size of which represents the corresponding amount of data. In the example shown in FIG. 23, the overall bar is divided up into an Accounts component 424, a Contacts component 426, an Opportunities component 428, and an Activities component 430. Each of the components of the bar 422 are shaded differently to distinguish them from each other. Alternatively, the components of the overall bar can be distinguished from each other using different colors, labels, or other distinguishable characteristics.

In the event that the estimate (step 406 of the method of FIG. 21) of the storage capacity of the mobile computing device 206 that would remain following a synch operation indicates that the mobile computing device 206 does not have enough storage capacity to complete the proposed synch operation, the synch operation is preferably prevented from occurring and the user notified of the problem. Additionally, the user can be provided with an estimate of the amount the storage capacity of the mobile computing device 206 has been exceeded. The user then has an opportunity to modify the subscriptions 302 until the subscriptions data quantity is reduced to a manageable amount for the mobile computing device 206. As a result, the present invention avoids data capacity overflow errors and eliminates the need for multiple synch operation attempts.

Although the present invention has been described with reference to particular embodiments, workers skilled in the art will recognize that changes may be made in form and detail without departing from the spirit and scope of the invention.

What is claimed is:

1. A computing device implemented method of managing a synch operation during which business solutions entities are loaded into a tangible mobile data store of a handheld mobile computing device from a central data storage system, the method comprising:

defining subscriptions identifying business solutions entities to be loaded into the mobile data store during a synch operation, wherein the subscriptions are defined by a user of the mobile computing device and the mobile data store contains a total amount of data, a portion of which corresponds to a quantity of entity data corresponding to at least one of the entities identified by the subscriptions;

estimating a current remaining data storage capacity of the mobile data store that is greater than a data storage capacity of the mobile data store less the total amount of data comprising calculating the current remaining data storage capacity in accordance with the following equation:

$$R = C - (T - E)$$

where R represents the current remaining data storage capacity of the mobile data store, C represents the data storage capacity of the mobile data store, T represents the total amount of data and E represents the quantity of entity data;

estimating a subscriptions data quantity corresponding to an amount of data space required to store the entities identified by the subscriptions;

comparing the subscriptions data quantity to the estimated current remaining data storage capacity; and displaying the subscriptions data quantity on the mobile computing device prior to performing the synch operation.

2. The method of claim 1, wherein the method comprises:

estimating, prior to performing the synch operation, a final remaining data storage capacity of the mobile data store that would remain if the synch operation occurred; and displaying the subscriptions data quantity comprises displaying the subscriptions data quantity relative to the estimated final remaining data storage capacity of the mobile data store.

3. The method of claim 2, wherein the displaying the subscriptions data quantity comprises displaying a graphical representation of the subscriptions data quantity.

4. The method of claim 3, wherein:

each of the entities are associated with a category; and the graphical representation of the subscriptions data quantity illustrates a breakdown of the subscriptions data quantity into the categories.

5. The method of claim 3, wherein the graphical representation of the subscriptions data quantity includes a bar graph.

6. The method of claim 1, wherein displaying the subscriptions data quantity comprises displaying a numerical representation of the subscriptions data quantity.

7. The method of claim 1 including generating a warning when the subscriptions data quantity exceeds the estimated current remaining data storage capacity of the mobile data store.

8. The method of claim 1 including preventing the synch operation between the mobile computing device and the central data storage system when the subscriptions data quantity exceeds the estimated current remaining data storage capacity of the mobile data store.

9. The method of claim 1, wherein estimating a subscriptions data quantity is performed in response to a user input.

10. The method of claim 1, wherein estimating a subscriptions data quantity is performed in response to a change in the subscriptions.

11. A handheld mobile computing device comprising:

a mobile data store containing a total amount of data;

subscriptions data identifying business solutions entities to be loaded to the mobile data store from a central data storage system during a synch operation, wherein a portion of the total amount of data corresponds to a quantity of entity data corresponding to at least one of the entities identified by the subscriptions; and a display of a subscriptions data quantity corresponding to an amount of data storage space required to store the entities identified by the subscriptions data relative to a display of an estimated final remaining storage capacity of the mobile data store that would remain after a synch operation, during which the business solutions entities identified by the subscriptions are loaded into the mobile data store from a central data storage system;

wherein the estimated final remaining storage capacity is equal to a current remaining data storage capacity of the mobile data store minus the subscriptions data quantity, wherein the current remaining data storage capacity (R) is calculated in accordance with the following equation:

$$R = C - (T - E)$$

where C represents a data storage capacity of the mobile data store, T represents the total amount of data and E represents the quantity of entity data.

12. The device of claim 11, wherein the displays of the subscriptions data quantity and the remaining data storage capacity comprise a graphical representation of at least one of the subscriptions data quantity and the remaining data storage capacity.

13. The device of claim 12, wherein the displays of the subscriptions data quantity and the remaining data storage capacity comprise a numeric representation of at least one of the subscriptions data quantity and the remaining data storage capacity.

14. The device of claim 12, wherein the graphical representation includes a bar graph.

15. The device of claim 12, wherein:
the entities identified by the subscriptions data are associated with categories; and
the graphical representation illustrates a breakdown of the subscriptions data quantity into the categories.

16. The device of claim 15, wherein the categories include a category selected from a group consisting of Accounts, Contacts, Opportunities and Activities.

17. The device of claim 11, wherein the displays of the subscription data quantity and the final remaining data storage capacity comprise graphical representations of the subscriptions data quantity and the final remaining data storage capacity comprising a bar graph having a scale corresponding to the remaining final data storage capacity.

18. The device of claim 11, wherein the display of the subscriptions data quantity comprises a graphical representation of the subscriptions data quantity.

19. The device of claim 18, wherein the graphical representation comprises a bar graph.

20. The device of claim 18, wherein:
the entities identified by the subscriptions data are associated with categories; and
the graphical representation illustrates a breakdown of the subscriptions data quantity into the categories.

21. The device of claim 20, wherein the categories include a category selected from a group consisting of Accounts, Contacts, Opportunities and Activities.

22. The device of claim 18, wherein the display includes a numeric representation of the subscriptions data quantity.

23. A computing device implemented method of managing a synch operation during which business solutions entities are loaded into a tangible mobile data store of a handheld mobile computing device from a central data storage system, the method comprising:
defining subscriptions identifying business solutions entities to be loaded into the mobile data store of the handheld mobile computing device during a synch operation, wherein the mobile data store contains a total amount of data, a portion of which corresponds to a quantity of entity data corresponding to at least one of the entities identified by the subscriptions;
estimating a current remaining data storage capacity of the mobile data store of the mobile computing device that is greater than a data storage capacity of the mobile data store less the total amount of data comprising calculating the current remaining data storage capacity in accordance with the following equation:

$$R = C - (T - E)$$

where R represents the current remaining data storage capacity of the mobile data store, C represents the data storage capacity of the mobile data store, T represents the total amount of data and E represents the quantity of entity data;
estimating a subscriptions data quantity corresponding to an amount of data space required to store the entities identified by the subscriptions;
estimating, prior to performing the synch operation, a final remaining data storage capacity of the mobile data store that would remain if the synch operation occurred;
comparing the subscriptions data quantity to the estimated current remaining data storage capacity;
displaying the subscriptions data quantity relative to the estimated final remaining data storage capacity of the mobile data store prior to performing the synch operation comprising displaying the subscriptions data quantity and the estimated final remaining data storage capacity; and
generating a warning when the subscriptions data quantity exceeds the estimated current remaining data storage capacity of the mobile computing device.

24. The method of claim 23, further comprising performing the synch operation when subscriptions data quantity does not exceed the estimated current remaining data storage capacity of the mobile data store.

* * * * *